United States Patent [19]

Kleinhans

[11] Patent Number: 5,079,523
[45] Date of Patent: Jan. 7, 1992

[54] INDUCTIVE POSITION INDICATOR USING TWO OSCILLATORS WITH PERIODICALLY INTERCHANGED INDUCTORS

[75] Inventor: Josef Kleinhans, Vaihingen/Enz, Fed. Rep. of Germany

[73] Assignee: Robert Bosch GmbH, Stuttgart, Fed. Rep. of Germany

[21] Appl. No.: 647,450

[22] Filed: Jan. 29, 1991

[30] Foreign Application Priority Data

Mar. 15, 1990 [DE] Fed. Rep. of Germany ....... 4008199

[51] Int. Cl.⁵ .............................. G01B 7/30; H03J 5/00
[52] U.S. Cl. ....................................... 331/65; 324/236; 340/686; 377/17
[58] Field of Search ............................ 331/65; 377/17; 324/327, 236, 328; 340/686; 361/180

[56] References Cited

U.S. PATENT DOCUMENTS 4,088,874  5/1978  Hartig ................................ 331/65 X
4,644,570  2/1987  Brosh et al. ............................ 377/17

Primary Examiner—Siegfried H. Grimm
Attorney, Agent, or Firm—Michael J. Striker

[57] ABSTRACT

An inductive position indicator in particular for determining an angular position of a throttle flap of an internal combustion engine comprises an oscillator circuit, reversible oscillating circuit branches, a position detecting element cooperating with the oscillating circuit branches for position-dependent change of their inherent frequencies, and an evaluating circuit which determines the position from the current inherent frequencies, the oscillator circuit having two oscillators which in one reverse position cooperate with an associated first respectively second oscillating circuit branch and in another reverse position oscillating circuit elements of the first and second oscillating circuit branches are exchanged with one another so that each oscillator cooperates with a third respectively a fourth oscillating circuit branch of another inherent frequency.

9 Claims, 3 Drawing Sheets

Fig. 3a
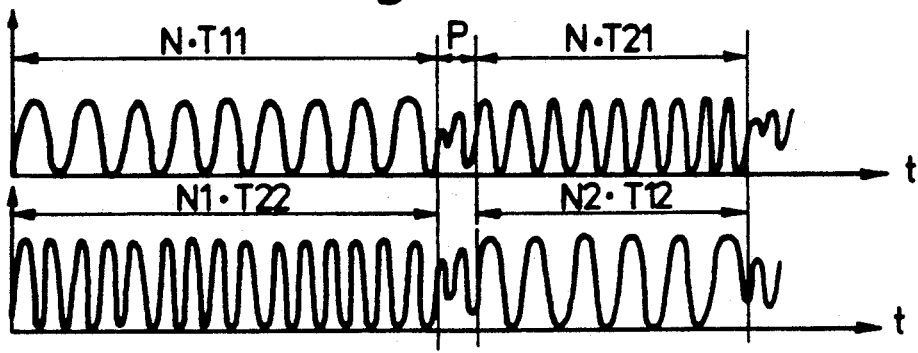
Fig. 3b
Fig. 4a
Fig. 4b
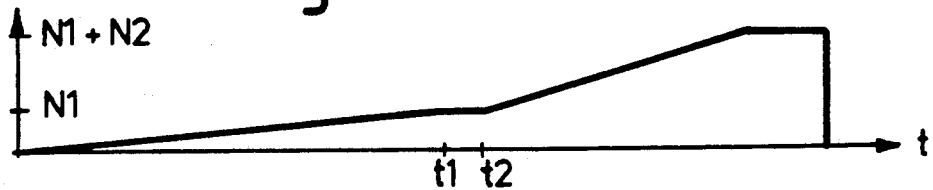
Fig. 4c
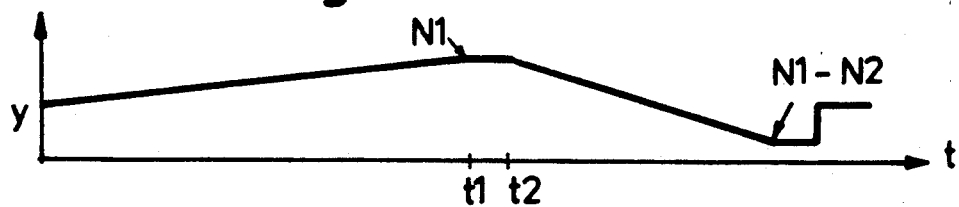
Fig. 4d
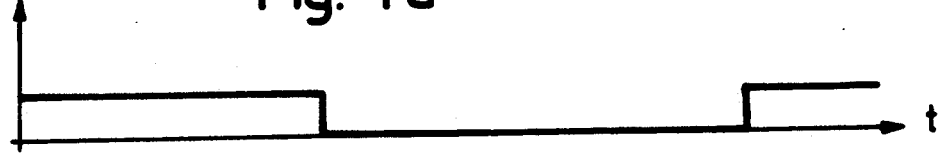

INDUCTIVE POSITION INDICATOR USING TWO OSCILLATORS WITH PERIODICALLY INTERCHANGED INDUCTORS

BACKGROUND OF THE INVENTION

The present invention relates to an inductive position indicator especially for determination of an angular position of a throttle flap of an internal combustion engine.

More particularly, it relates to such an inductive position indicator which has an oscillator circuit and reversible oscillating circuit branches, as well as a position detecting element which cooperates with the oscillating circuit branches for position-dependent change of its inherent frequencies, and with an evaluating circuit which determines the position from the adjusting inherent frequencies.

In many fields of technology it is required to determine the position of a control member, such as for example a throttle flap or the like. For this purpose, inductive position indicators are used in which in dependence on the position a change in the inductance of at least one coil is adjusted. The respective inductance value is therefore a measurement for the position. When compared with a position determination by means of a potentiometer, this method provides for the advantage in that the inductive position indicator is less vulnerable to dirtying which can lead to contact problems and therefore to faulty measurements. Also, such an inductive position indicator has a lower wear due to its contact-free operational principle.

An inductive position indicator of the above mentioned general type is disclosed in U.S. Pat. No. 4,644,570. Here the position detecting element is formed as a differential transmitter. This means that two electric values change oppositely in dependence on the detected position. For this purpose two coils are provided and cooperate with a core in accordance with the eddy current principle, so that depending on the position it approaches correspondingly one of the coils and moves away from the other coil. The coils are connected alternatingly with a capacitor so that in one switching position a first oscillating circuit branch and in the other switching position a second oscillating circuit branch is formed. Both oscillating circuit branches are operated one after the other with an oscillator of an oscillator circuit, and due to the position-dependent inductance values, the associated inherent frequencies are adjusted. The disadvantage here is that the known inductive position indicator has a relatively low sensitivity and is further subjected to a non-linearity. Furthermore, during reversing of the oscillating circuit transient oscillations occur which distort the measurement results.

SUMMARY OF THE INVENTION

Accordingly, it is an object of the present invention to provide an inductive position indicator which avoids the disadvantages of the prior art.

More particularly, it is an object of the present invention to provide an inductive position indicator which has a high sensitivity and therefore a high resolution to measuring values and moreover does not produce linearity errors.

In keeping with these objects and with others which will become apparent hereinafter, one feature of the present invention resides, briefly stated, in an inductive position indicator in which the oscillator circuit has two oscillators which in one of the reverse positions cooperates respectively with an associated first or second oscillating circuit branch and in another reverse position oscillating circuit elements with the first and second oscillating circuit branches are exchanged, each oscillator cooperates with a so-formed third respectively fourth oscillating circuit branch of another inherent frequency. In a reverse position, the first oscillator cooperates with the first oscillating circuit branch and the second oscillator cooperates with the second oscillating circuit branch. The inherent frequencies of the oscillating circuit branches are determined by the above mentioned position detecting element. The oscillators adjust their inherent frequencies to the inherent frequency of the respective oscillating circuit branch automatically. When the reverse is performed the first oscillator cooperates with the third oscillating circuit branch and the second oscillator cooperates with the fourth oscillating circuit branch, and due t the position-dependent inductive change the corresponding other inherent frequencies are adjusted.

In accordance with the present invention the formation of the third and the fourth oscillating circuit branch is achieved in that the oscillating circuit elements can be mutually "exchanged" by the reversing. This is illustrated in the following example:

The one oscillator cooperates in one reverse position with a first coil and a first capacitor. The second oscillator operates in this first reverse position with a second coil and a second capacitor. After the reversing, the first oscillator controls the second coil which however is connected with the first capacitor. Correspondingly in this reverse position the first coil connected with the second capacitor is operated by the second oscillator. Due to the adjusted inherent frequencies the present position can be determined by the evaluating circuit.

In accordance with a further embodiment of the present invention the oscillating circuit branches, as mentioned, include two capacitors and two coils. Both coils are switchable by the reverse alternatingly to both capacitors. This has been already illustrated.

Each oscillating circuit branch is associated with a corresponding inherent frequency. The four oscillating circuit branches have the following oscillation times:

For the first coil:

$$T11 = 2 \cdot \pi \cdot \sqrt{L1 \cdot C1}$$

$$T12 = 2 \cdot \pi \cdot \sqrt{L1 \cdot C2}$$

For the second coil:

$$T21 = 2 \cdot \pi \cdot \sqrt{L2 \cdot C1}$$

$$T22 = 2 \cdot \pi \cdot \sqrt{L2 \cdot C2}$$

The oscillating time T11 is associated with the first oscillating circuit branch, the oscillation time T22 is associated with the second oscillating circuit branch, the oscillation time T21 is associated with the third oscillating circuit branch, and the oscillation time T12 is associated with the fourth oscillating circuit branch.

It is provided in particular that the evaluating circuit presumes a predetermined number N of oscillations, which in one reverse position is associated with a first time period N·T11 of the first oscillating circuit branch, and within the time period N1·T22 which is equal to time period N·T11 and runs simultaneously the number of the oscillations and one of the second oscillating circuit branches is determined. After determination of the N oscillations, the reverse is performed and the evaluating circuit presents the predetermined number N of the oscillations, which is associated with a third time period N·T21 of the third oscillating circuit branch. Within the fourth time interval N·T12 which is equal to the third time interval N·T21 and runs simultaneously, the number of the oscillations N2 of the fourth oscillating circuit branch is determined.

Preferably from the determined values N1 and N2 the corresponding position is determined by the evaluating circuit. The evaluating circuit forms the following ratio:

$$\frac{N1 - N2}{N1 + N2}$$

This ratio is proportional to the determined position. In accordance with the present invention a linearity is provided for the position region, especially angular position region, as well as a high sensitivity.

For avoiding a measuring error, the evaluating circuit after a reverse provides the evaluating after determination of a transient oscillation pause. It is safer when the transient oscillation processes fade out before the evaluation is performed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 3a and 3b are views illustrating inherent frequencies of different oscillation circuits of the inductive position indicator; and FIGS. 4a, 4b, 4c, 4d are views showing diagrams of different values of the circuit arrangement of FIG. 2.

DESCRIPTION OF THE PREFERRED EMBODIMENTS

Figure 1:
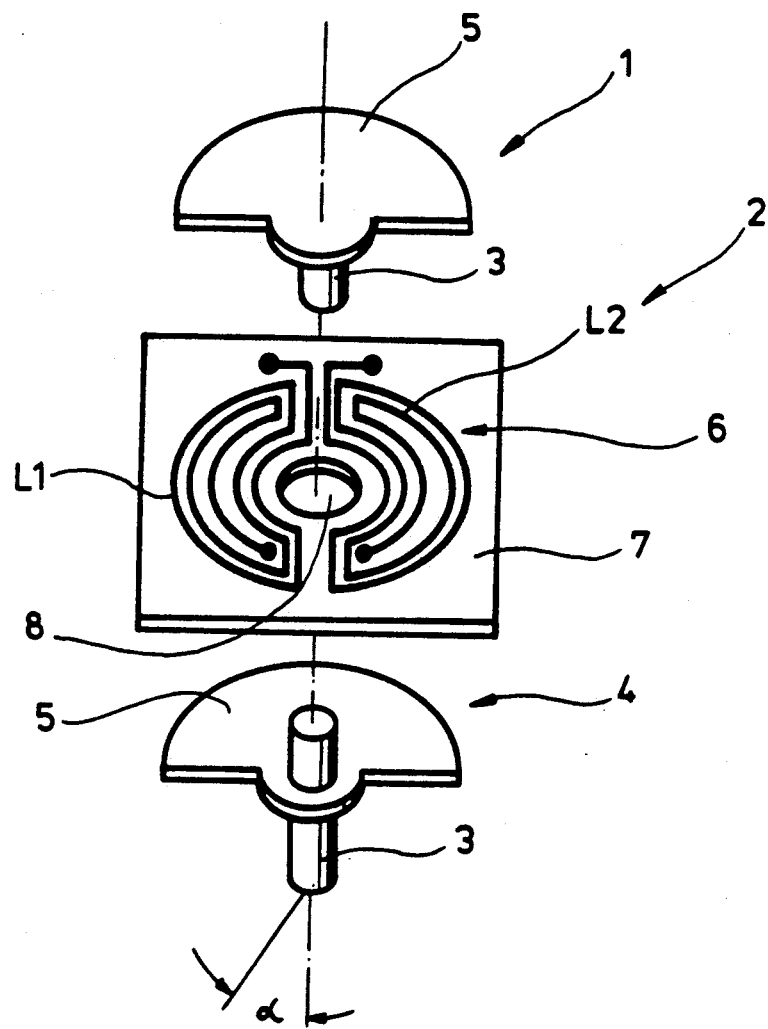
FIG. 1 is an explosion view of a position determining element of an inductive position indicator, formed as a differential indicator.

FIG. 1 shows a position determining element 1 of a differential indicator 2 for an inductive position indicator. The inductive position indicator is used for determination of the position of a throttle flap in a not shown internal combustion engine. With change in the angular position of the throttle flap, an axis 3 of a core 4 is turned. The angle of turning is identified in FIG. 1 with $\alpha$. The core 4 is assembled of two parallel circular portions 5 of a plate-shaped electrically conductive material. It cooperates with a coil arrangement 6 applied on a substrate 7 in a special configuration. The special configuration resides in that the coil arrangement is assembled of a first coil L1 and a second coil L2. Both coils L1 and L2 are arranged on a surface of the substrate 7 in semi-circular base shape around a throughgoing opening 8.

FIG. 1 shows an explosion view of the position determining element 1. In real situation the axle 3 is not interrupted but engages with the throughgoing opening 8 so that both circular portions 5 are placed at both sides of the coil arrangement 6 at small distance to the same. Depending on the present angle of turning $\alpha$ a corresponding partial region of the coil arrangement is overlapped by the circular portions 5, so that with the energized coil arrangement 6 a reaction operating in accordance with the eddy current principle is applied in dependence on the angle of turning $\alpha$.

The arrangement shown in FIG. 1 is naturally only an example of a position determining element. It is to be understood that also the use of position determining elements designed in a different way but operating with the same principle is possible. An angular position, or also a displacement position of a translatory movement path of the position determining element can be detected as well. What is important however is that always two coils L1 and L2 are provided, which cooperate with a core so that with the value in which one coil L1 acts to reinforce the action with the core 4, the other coil L2 is subjected to correspondingly smaller reaction. This is how the differential principle is obtained.

Figure 2:
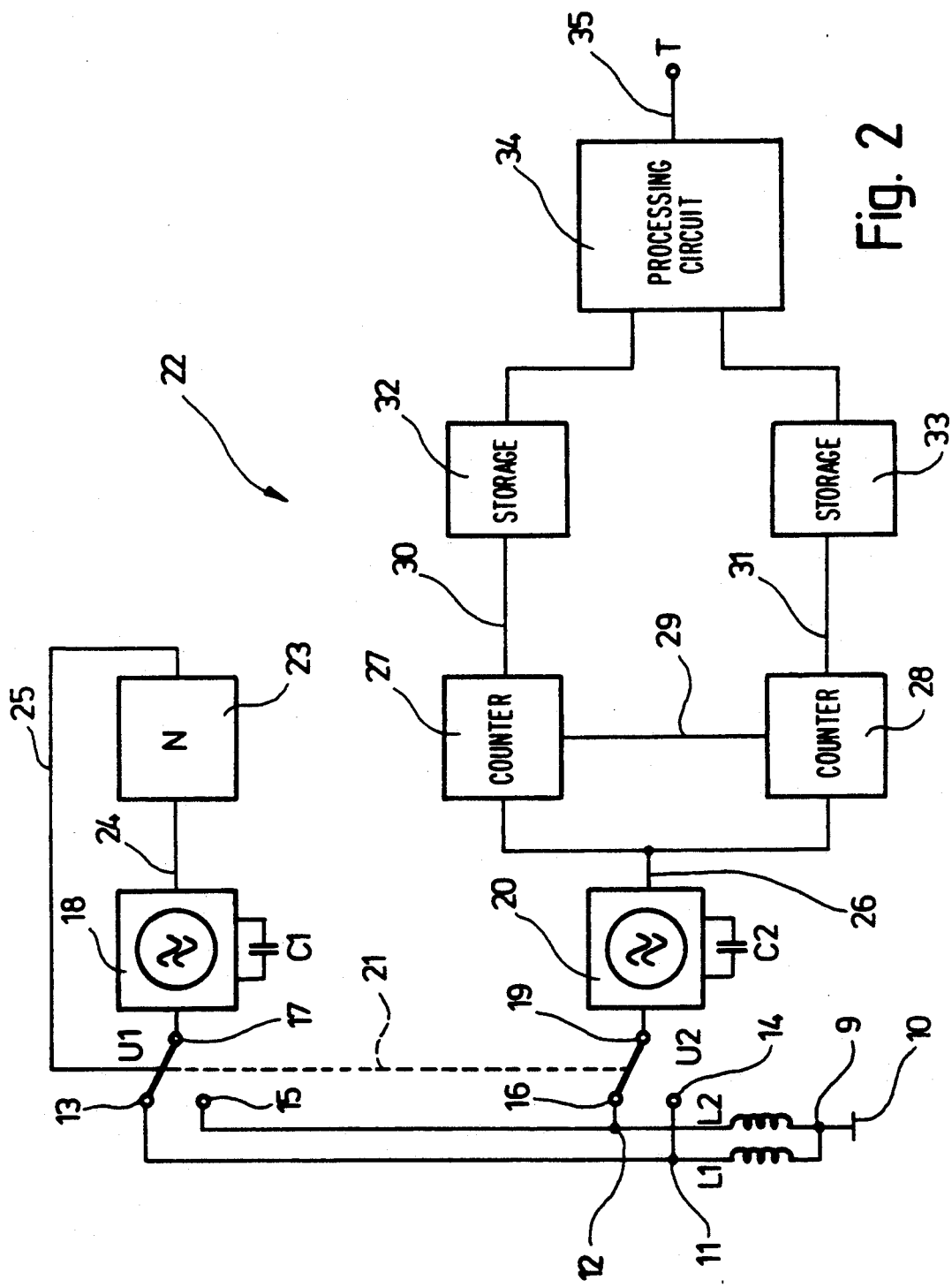
FIG. 2 is a block diagram of the inductive position indicator.

The position determining element is a part of the inductive position indicator, whose operational principle is illustrated in the block diagram of FIG. 2.

The above mentioned coils L1 and L2 can be seen in this Figure. They are connected by their one terminal to a summing point 9 associated with a mass 10. The other terminals 11 and 12 of the coils L1 and L2 lead to contacts 13 - 16 of the two reversers U1 and U2. The terminal 11 of the coil L1 is connected with a contact 13 of the reverser U1 and a contact 14 of the reverser U2. A contact 15 of the reverser U1 and a contact 16 of the reverser U2 are connected with the terminal 12 of the coil L2. The terminal 17 of the reverser U1 is connected with a first oscillator 18 and the terminal 19 of the reverser U2 is connected with a second oscillator 20.

A first condenser C1 is associated with the first oscillator 18 and a second condenser C2 is associated with the second oscillator 19. Both reversers U1, U2 are coupled with one another through an operative connection 21 so that they can be activated only synchronously. This leads to the fact that in a first reverse position shown in FIG. 2, the first oscillator 18 cooperates with the first coil L1 and the first capacitor C1, and the second oscillator 20 cooperates with the second coil L2 and the second capacitor C2. Thus, the first coil L1 with the first capacitor C1 forms a first oscillating circuit branch S1, while the second oscillating branch S2 is formed by the second coil L2 and the second capacitor C2.

When the coupled reversers U1 and U2 assume their different reverse positions, the first oscillator 18 is connected with the second coil L2 and the first capacitor C1, and the second oscillator 20 is connected with the second capacitor C2 and the first coil L1. The second coil L2 forms with the first capacitor C1 a third oscillating circuit branch S3, and the first coil L1 together with the second capacitor C2 belongs to a fourth oscillating circuit branch S4.

It is therefore believed to be clear that by the reverse both coils L1 and L2 are alternatingly connected with the capacitors C1 and C2 so that they form the four oscillating circuit branches S1–S4.

The inductances of the coils L1 and L2 are position-dependent. In other words, with change of the turning angle α and the extension of the core 4, the eddy current coupling changes, and due to changing inductances in the oscillating circuit branches S1-S4, in corresponding manner changing inherent frequencies are adjusted. The consideration of the oscillation time of different oscillating circuit branches S1-S4 provides the following:

For the coil L1:

$$T11 = 2 \cdot \pi \cdot \sqrt{L1 \cdot C1}$$

$$T12 = 2 \cdot \pi \cdot \sqrt{L1 \cdot C2}$$

For the second coil L2:

$$T21 = 2 \cdot \pi \cdot \sqrt{L2 \cdot C1}$$

$$T22 = 2 \cdot \pi \cdot \sqrt{L2 \cdot C2}$$

FIG. 2 further shows an evaluating circuit 22 which determines the associated position (angle of turning α) from the inherent frequencies of the oscillating circuit branches S1-S4. In the simplified, schematic view of FIG. 2 the evaluating circuit 22 has a counter 23 connected with an output 24 of the first oscillator 18 and cooperating through a operating connection 25 with the reversers U1 and U2. The output 26 of the second oscillator 20 is connected with a counter 27 and a counter 28, which are connected with one another through a conductor 29. Outputs 30 and 31 of the counters 27 and 28 lead to intermediate storages 32 and 33 which are connected with a processing circuit 34. It supplies a keying ratio T which is proportional to the position to be determined (angle of turning α) at its output 35.

The operation is performed in the following manner: A number N of oscillations is presented at the counter 23 of the evaluating circuit 22. Each oscillation of the oscillator 18 leads to a counting-up of the counter 22 until it reaches its counting stage N with respectively the oscillation number N. This is shown in FIG. 3a.

In a reverse position of the reversers U1 and U2 shown in FIG. 2, the first oscillator 18 cooperates with the first capacitor C1 and first coil L1; it is relevant in FIG. 3a to the oscillation time T11 of the first oscillating circuit branch S1. After N oscillations a first time interval N·T11 elapses (in the shown embodiment N=9; and in the counter 23 is therefore the number N=9 present). Simultaneously and in the same reverse position the oscillation time T22 is present in the second oscillating circuit branch S2, and the number N1 of the associated oscillations in the second time interval N·T22 which is correspondingly equal to the first time internal N·T11 is dependent on the value of the second coil L2 and the second capacitor C2 (FIG. 3b). Since the capacitor C1 and C2 are not changeable in their value, and only the coils L1 and L2 have correspondingly varying inductance values in dependence on the present position, the oscillation number N1 is position dependent. The number N1 of the oscillations is determined by the evaluating circuit 22.

When the first time interval N·T11 elapses, or in other words the counter 23 reaches its end value, the reversers U1 and U2 reverse to their other reverse position. The first oscillator 18 therefore cooperates with the first capacitor C1 and the second coil L2, while the second oscillator 20 cooperates with the second capacitor C2 and the first coil L1. Due to the reverse process, the counter 23 is set back, and after this the evaluating circuit or in other words, the counter 23 again provides the predetermined oscillation number N. Thereby a third time internal N·T21 is produced which results in that N oscillations are permitted by the counter 23 and the oscillation time T21 in the present reverse position is relevant for the first oscillator 18. Simultaneously, the second oscillator cooperates with the fourth oscillating circuit branch S4 which is associated with the oscillation time T12. From this a fourth time interval N2·T12 which is equal to the third time interval N·T21 is produced, and the number N2 of the oscillations of the fourth oscillating circuit branch S4 is determined (FIG. 3b).

The counter 27 is formed so that it forms the sum of the oscillation numbers N1 and N2, while the counter 28 determines the difference of the oscillation numbers N1-N2. The determined values are transmitted to the intermediate storages 32 and 33 and from there to the processing circuit 34 which forms the $$\frac{N1 - N2}{N1 + N2}$$

Mathematically, the following is obtained:

For the number N of the oscillations:
$N \cdot T11 = N1 \cdot T22$ and
$N \cdot T21 = N2 \cdot T12$.

When the above mentioned ratio is formed, the following is obtained:

$$\frac{N1 - N2}{N1 + N2} = \frac{N \cdot T11/T22 - N \cdot T21/T12}{N \cdot T11/T22 + N \cdot T21/T12}$$

$$= \frac{T11 \cdot T12 - T21 \cdot T22}{T11 \cdot T12 + T21 \cdot T22}$$

When for the oscillation times the corresponding relations for the oscillating circuit elements are introduced, the following is obtained:

$$\frac{N1 - N2}{N1 + N2} = \frac{\sqrt{L1^2 \cdot C1 \cdot C2} - \sqrt{L2^2 \cdot C1 \cdot C2}}{\sqrt{L1^2 \cdot C1 \cdot C2} + \sqrt{L2^2 \cdot C1 \cdot C2}}$$

$$= \frac{L1 - L2}{L1 + L2}$$

Due to the differential ratio the following relation is determined:

$$L1 = L0 + \delta L$$

$$L2 = L0 - \delta L$$

When this relation is introduced into the preceding equation, the following is obtained:

$$\frac{N1 - N2}{N1 + N2} = \frac{L0 + \delta L - L0 - \delta L}{L0 + \delta L + L0 - \delta L}$$

$$= \delta L/L0 = C \cdot \alpha$$

In the last correlation it is presumed that an inductance change cooperates linearly with the indicator values (here angle of turning α). It can h=seen from this that the output value of the inventive position indicator is linear with the angle of turning $\alpha$. With c (constant) the sensitivity of the circuit is indicated.

When a known circuit corresponding to the prior art is considered, the two oscillating circuit branches have the oscillation times $$T1 = 2 \cdot \pi \cdot \sqrt{L1 \cdot C}$$

$$T2 = 2 \cdot \pi \cdot \sqrt{L2 \cdot C}$$

When from this a transformed keying ratio is formed, the following is obtained $$x = \frac{T1 - T2}{T1 + T2}$$

$$= \frac{\sqrt{L1} - \sqrt{L2}}{\sqrt{L1} + \sqrt{L2}} \approx \frac{1}{2} \cdot \frac{\delta L}{L0} \cdot \left[ 1 + \frac{1}{4} \cdot (\delta L/L0)^2 \right]$$

For the output value x it is $$x = \frac{1}{2} \cdot C \cdot \alpha \cdot \left[ 1 + \frac{1}{4} \cdot (C \cdot \alpha)^2 \right]$$

The sensitivity of the circuit is therefore $\frac{1}{2} \cdot C$; the linearity error amounts to $\frac{1}{4} \cdot (C \cdot \alpha)^2$.

When these results are compared with the inventive arrangement, a doubled sensitivity is determined. Furthermore, the non-linearity in the known circuit is not present in the inventive arrangement.

From consideration of FIGS. 3a and 3b, it is clear that between the time intervals N·T11 and N·T21, and respectively N1·T22 and N2·T12 a transient oscillation pause P is located. In the proposed invention, this can be realized by circuitry measures (for example, a monoflap can hold the counter state). Hereby the transient oscillation process which occurs due to reversing of the reversers U1 and U2 is negligible so that the measuring errors are avoided.

FIG. 4a shows the state at the output 25 of the counter 23. It can be seen that it always counts to the value N and is then reset within the first respectively second and within the third respectively fourth time interval. FIG. 4b deals with the output 30 of the counter 27. It counts first up to the time point t1 to the value N1 and then starting at the time point t2 to the value N1+N2.

FIG. 4c shows the output 31 of the counter 28 which, starting from a value y, up to the time point t1 counts up to the value N1, and then starting from the point t2, counts down the value N2 so as to produce the value N1-N2.

At the output 35 of the processing circuit 34 the keying ratio T is available, which in accordance with the equation is $$T = 0.5 + \frac{N1 - N2}{N1 + N2}$$

(FIG. 4d). The term 0.5 is purposely produced so as to obtain no negative output value (this would be present when N2>N1).

The term 0.5 represents however an offset.

It will be understood that each of the elements described above, or two or more together, may also find a useful application in other types of constructions differing from the types described above.

While the invention has h=en illustrated and described as embodied in an inductive position indicator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An inductive position indicator in particular for determining an angular position of a throttle flap of an internal combustion engine, comprising an oscillator circuit; reversible oscillating circuit branches; a position detecting element cooperating with said oscillating circuit branches for position-dependent change of their inherent frequencies; and an evaluating circuit which determines the position from the current inherent frequencies, said oscillator circuit having two oscillators which in one reverse position cooperate with an associated first respectively second oscillating circuit branch and in another reverse position oscillating circuit elements of the first and second oscillating circuit branches are exchanged with one another so that each oscillator circuit branch of another inherent frequency.

2. A position indicator as defined in claim 1, wherein said oscillating circuit branches are formed by two capacitors and two coils arranged so that both said coils are switched during the reverse alternatingly to both said capacitors.

3. A position indicator as defined in claim 1, wherein said four oscillating circuit branches have the following oscillating times:

for a first oscillating circuit element:

$$T11 = 2 \cdot \pi \cdot \sqrt{L1 \cdot C1}$$

$$T12 = 2 \cdot \pi \cdot \sqrt{L1 \cdot C2}$$

for a second oscillating element:

$$T21 = 2 \cdot \pi \cdot \sqrt{L2 \cdot C1}$$

$$T22 = 2 \cdot \pi \cdot \sqrt{L2 \cdot C2} \,,$$

where L1, L2 and C1, C2 are respectively inductances and capacitances in said circuit branches.

where L1, L2 and C1, C2 are respectively inductances and capacitances in said circuit branches.

4. A position indicator as defined in claim 1, wherein said evaluating circuit provides a predetermined number N of oscillations which is associated with one reverse position with a first time interval N·T11 of the first oscillating circuit branch, and inside a second time interval N1·T22 which is equal to the first time interval N·T11 and runs down simultaneously, the number N1 of the oscillations of the second oscillating circuit branch is determined.

5. A position indicator as defined in claim 4, wherein said evaluating circuit in the other reverse position provides also the predetermined number N of oscillations which is associated with a third time interval N·T21 of the third oscillating circuit branch, and within a fourth time interval N2·T12 equal to the third time interval N·T21 and running down simultaneously, the number N2 of the oscillations of the fourth oscillating circuit branch is determined.

6. A position indicator as defined in claim 5, wherein the evaluating circuit from the determined oscillation numbers N1 and N2 determines the following ratio which is proportional to a position to be determined $$\frac{N1 - N2}{N1 + N2}.$$

7. A position indicator as in defined claim 1, wherein said oscillating circuit elements are formed as coils, said position detecting element cooperating with said coils.

8. A position indicator as defined in claim 7, wherein said oscillating circuit elements also include a core such that with a change in a position of said position detecting element an electromagnetic coupling of said core to said coils is changed.

9. A position indicator as defined in claim 1, wherein said evaluating circuit after a reverse starts an evaluation first after elapsing of a transient oscillation pause.

* * * * *